US011600183B2

(12) United States Patent
Uehara et al.

(10) Patent No.: US 11,600,183 B2
(45) Date of Patent: Mar. 7, 2023

(54) DISPATCH DEVICE AND DISPATCHING METHOD

(71) Applicant: Toyota Jidosha Kabushiki Kaisha, Toyota (JP)

(72) Inventors: Yasuo Uehara, Gotemba (JP); Nobuhide Kamata, Susono (JP); Nozomu Hatta, Susono (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 16/791,261

(22) Filed: Feb. 14, 2020

(65) Prior Publication Data

US 2020/0265720 A1  Aug. 20, 2020

(30) Foreign Application Priority Data

Feb. 18, 2019 (JP) .............................. JP2019-026823

(51) Int. Cl.
*G08G 1/00* (2006.01)
*B60W 60/00* (2020.01)
*H04W 4/021* (2018.01)
*G06Q 50/30* (2012.01)

(52) U.S. Cl.
CPC ......... *G08G 1/202* (2013.01); *B60W 60/0021* (2020.02); *B60W 60/00253* (2020.02); *B60W 60/00256* (2020.02); *G06Q 50/30* (2013.01); *H04W 4/021* (2013.01)

(58) Field of Classification Search
CPC ............ G08G 1/202; B60W 60/00256; B60W 60/0021; B60W 60/00253; G06Q 50/30; H04W 4/021; H04W 4/44; H04W 4/02; H04L 67/12; H04L 67/18; H04L 67/52
See application file for complete search history.

(56) References Cited

U.S. PATENT DOCUMENTS

| | | | |
|---|---|---|---|
| 10,086,782 B1* | 10/2018 | Konrardy | .................. B60P 3/12 |
| 10,217,069 B2* | 2/2019 | Scicluna | ................ G06Q 50/10 |
| 10,233,021 B1* | 3/2019 | Brady | .................. G05D 1/0282 |
| 10,775,806 B2* | 9/2020 | Abari | ..................... G05D 1/0291 |
| 2015/0339923 A1* | 11/2015 | Konig | ...................... H04L 67/12 |
| | | | 701/522 |
| 2016/0217691 A1* | 7/2016 | Kadobayashi | ......... G08G 1/005 |
| 2018/0275648 A1* | 9/2018 | Ramalingam | ...... G01C 21/3438 |

(Continued)

FOREIGN PATENT DOCUMENTS

| | | |
|---|---|---|
| JP | 2004-302942 A | 10/2004 |
| JP | 2017-182137 A | 10/2017 |

(Continued)

*Primary Examiner* — James J Lee
*Assistant Examiner* — Alexander George Matta
(74) *Attorney, Agent, or Firm* — Dinsmore & Shohl LLP

(57) ABSTRACT

A dispatch device includes an information acquisition unit that acquires, for each of a plurality of vehicles, location information indicating a location of the vehicle and loaded object information indicating a status of an object of transportation loaded on the vehicle and a vehicle dispatching unit that dispatches an unfilled vehicle that can carry an object of transportation so that a predetermined number or higher number of unfilled vehicles, are present around an operating vehicle that is carrying an object of transportation.

14 Claims, 8 Drawing Sheets

(56) References Cited

U.S. PATENT DOCUMENTS

| | | | |
|---|---|---|---|
| 2018/0349825 A1 | 12/2018 | Yamamoto et al. | |
| 2018/0357907 A1* | 12/2018 | Reiley | H04W 4/44 |
| 2019/0004546 A1* | 1/2019 | Friedmann | H04W 4/02 |
| 2019/0103028 A1 | 4/2019 | Kobayashi et al. | |
| 2019/0196512 A1* | 6/2019 | Blake | G06Q 10/083 |
| 2019/0206009 A1* | 7/2019 | Gibson | G06Q 10/06315 |

FOREIGN PATENT DOCUMENTS

| | | |
|---|---|---|
| JP | 2018-169985 A | 11/2018 |
| JP | 2018-205829 A | 12/2018 |

\* cited by examiner

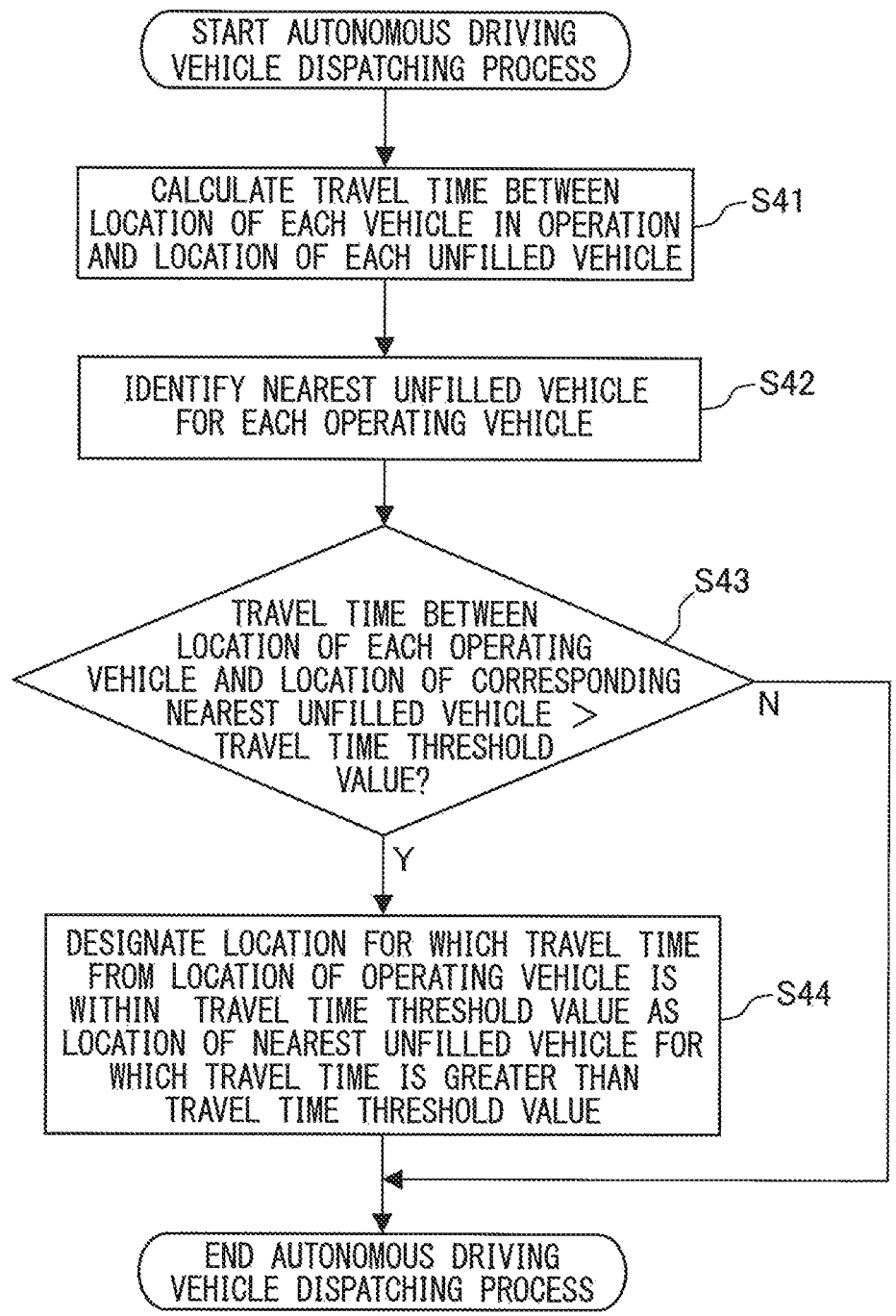

DISPATCH DEVICE AND DISPATCHING METHOD

CROSS-REFERENCE TO RELATED APPLICATION

This application claims priority to Japanese Patent Application No. 2019-026823 filed on Feb. 18, 2019, the entire contents of which are herein incorporated by reference.

FIELD

The present disclosure relates to a dispatch device and a dispatching method.

BACKGROUND

A transportation service delivery system is known that causes an autonomous driving vehicle to travel toward a destination designated by a dispatch device to provide a transportation service to an occupant. The dispatch device designates, on the basis of information such as a ride request or a drop-off request from the occupant, a destination for the autonomous driving vehicle. The autonomous driving vehicle travels toward the destination with its operation such as driving, steering and braking controlled by a driving controller installed therein. The driving controller controls driving of the autonomous driving vehicle on the basis of location information output by a measurement device installed in the vehicle and vehicle related information such as image information acquired by an image pickup device.

When providing a transportation service using the transportation service delivery system, it is important to dispatch an autonomous driving vehicle so as to reach a location designated by a passenger requesting a ride on time.

In Japanese Unexamined Patent Publication (Kokai) No. 2018-169985 (PTL 1), a transportation system is disclosed that determines, in accordance with a degree of transportation demand by passengers in an operation area, the number of vehicles operating in a zone allocated to the vehicles in the operation area.

SUMMARY

In a ride-sharing system in which a plurality of objects of transportation destined for different destinations share a ride on a vehicle, longer time and travel distances would be required to reach the destinations than in a system without the ride share. In addition, in order to enable an object of transportation that happens to get out of the vehicle halfway through the travel to reach the destination with the least delay, it is important to make an amount of time until transfer to the next vehicle as short as possible.

The transportation system of PTL 1 can prevent, by appropriately assigning vehicles in the operation area in accordance with transportation demand by passengers, occurrence of various problems such as disparity in the numbers of passengers among vehicles and delay from an operation diagram. However, the transportation system of PTL 1 focuses on convenience of an occupant who newly gets into a vehicle while not considering convenience of an occupant who happens to get out of the vehicle halfway through the travel.

An object of the present disclosure is to provide a dispatch device that dispatches, in such a way that an object of transportation that happens to get out of a vehicle halfway through the travel can transfer to another vehicle to reach a destination with the least delay, another vehicle that can carry the object of transportation (hereinafter, referred to as an "unfilled vehicle").

A dispatch device according to the present disclosure is characterized in that the dispatch device includes an information acquisition unit that acquires, for each of a plurality of vehicles, location information indicating a location of the vehicle and loaded object information indicating a status of an object of transportation loaded on the vehicle and a vehicle dispatching unit that dispatches an unfilled vehicle so that a predetermined number or higher number of unfilled vehicles that can carry an object of transportation of the plurality of vehicles, are present around a location of an operating vehicle carrying an object of transportation of the plurality of vehicles.

In the dispatch device according to the present disclosure, the vehicle dispatching unit may dispatch the unfilled vehicle in such a way that, when a distance between a location of the operating vehicle and a location of the unfilled vehicle closest to the location of the operating vehicle is greater than a distance threshold value, at least one of the unfilled vehicles travels through a location within a distance equal to or less than the distance threshold value from the location of the operating vehicle.

The dispatch device according to the present disclosure further includes a route setting unit that sets, for each of the plurality of vehicles, a travel route indicating expected locations of the vehicle at certain times from a current location of the vehicle to the destination, and the vehicle dispatching unit may modify, when there is a time at which a distance to the unfilled vehicle is greater than the distance threshold value on the travel route of the operating vehicle, the travel route of the unfilled vehicle so that the location of the unfilled vehicle traveling through a location closest to the location of the operating vehicle at the time is changed to a location within a distance equal to or less than the distance threshold value from the location of the operating vehicle.

In the dispatch device according to the present disclosure, the vehicle dispatching unit may arrange the unfilled vehicle so that, when a travel time, which is an amount of time required for the unfilled vehicle to move to an area within a distance equal to or less than the distance threshold value from the location of the operating vehicle, for the unfilled vehicle for which the travel time is minimum is greater than a travel time threshold value, at least one of the unfilled vehicles travels through a location for which the travel time from the location of the operating vehicle is equal to or less than the travel time threshold value.

The dispatch device according to the present disclosure further includes a route setting unit that sets, for each of the plurality of vehicles, a travel route indicating expected locations of the vehicle at certain times from a current location of the vehicle to the destination, and the vehicle dispatching unit may designate, when there is a time at which the minimum travel time from the location of the unfilled vehicles is greater than the travel time threshold value on the travel route of the operating vehicle, a location at the time for which the minimum travel time from the location of at least one of the unfilled vehicles is not greater than the travel time threshold value as the location of the at least one unfilled vehicle.

In the dispatch device according to the present disclosure, the vehicle dispatching unit may dispatch an autonomous driving vehicle so that, when the location of the operating vehicle is in a zone of a plurality of geographical zones, a ratio of the number of unfilled vehicles in the zone to the number of vehicles traveling in the zone is equal to a ratio of the number of unfilled vehicles in another zone to the number of vehicles traveling in the another zone.

In the dispatch device according to the present disclosure, the vehicle dispatching unit may identify, for each operating vehicle, an unfilled vehicle for which the travel time to the location of the operating vehicle is minimum, and designates, as a location of an unfilled vehicle for which the travel time is greater than the travel time threshold value, a location for which the travel time from the location of the operating vehicle corresponding to the unfilled vehicle is equal to or less than the travel time threshold value.

For the dispatch device according to the present disclosure, the vehicle may be an autonomous driving vehicle.

A dispatching method according to the present disclosure is a dispatching method in which a vehicle is dispatched by a dispatch device and characterized in that the dispatch device acquires, for each of a plurality of vehicles, location information indicating a location of the vehicle and loaded object information indicating a status of an object of transportation loaded on the vehicle and that the dispatch device dispatches an unfilled vehicle so that a predetermined number or higher number of unfilled vehicles that can carry an object of transportation, of the plurality of vehicles, are present around a location of an operating vehicle carrying an object of transportation of the plurality of vehicles.

The dispatch device according to the present disclosure can dispatch another vehicle with an unoccupied seat, in order to enable an object of transportation that happens to get out of the vehicle halfway through the travel to reach the destination with the least delay, so that an amount of time required for transfer to another vehicle can be reduced as short as possible.

BRIEF DESCRIPTION OF DRAWINGS

FIG. 13 is a fourth process flowchart of the autonomous driving vehicle dispatching process for the dispatch device.

DETAILED DESCRIPTION

With reference to the drawings, a dispatch device and a dispatching method will be described in detail below. However, it should be understood that the present disclosure is not limited to the drawings nor embodiments to be described below.

The dispatch device according to the present disclosure acquires, for each of a plurality of vehicles, location information indicating a location of the vehicle and loaded object information indicating a status of an object of transportation loaded on the vehicle. In addition, the dispatch device dispatches unfilled vehicles that can carry an object of transportation so that a predetermined number or higher number of the unfilled vehicles are present around a location of an operating vehicle carrying an object of transportation of the plurality of vehicles. Accordingly, the dispatch device can dispatch another vehicle, in order to enable an object of transportation that happens to get out of the vehicle halfway through the travel due to the vehicle falling into an undrivable condition, etc., to reach the destination with the least delay, so that an amount of time required for transfer to another vehicle can be reduced as short as possible.

Vehicles dispatched by the dispatch device according to the present disclosure include a vehicle driven by a driver and an autonomous driving vehicle. In the embodiments below, the dispatch device that dispatches an autonomous driving vehicle will be described, however, the dispatch device according to the present disclosure can similarly dispatch a vehicle driven by a driver.

In addition, vehicles dispatched by the dispatch device according to the present disclosure may be a vehicle for which an object of transportation is a human being (for example, a taxi, a ride-share vehicle, etc., and the human being as the object of transportation may be also referred to as an "occupant") or a vehicle for which the object of transportation is a piece of goods (e.g., a truck, etc.). In the embodiments below, the dispatch device that dispatches a vehicle for which the object of transportation is a human being will be described, however, the dispatch device according to the present application can similarly dispatch a vehicle for which the object of transportation is a piece of goods.

Figure 1:
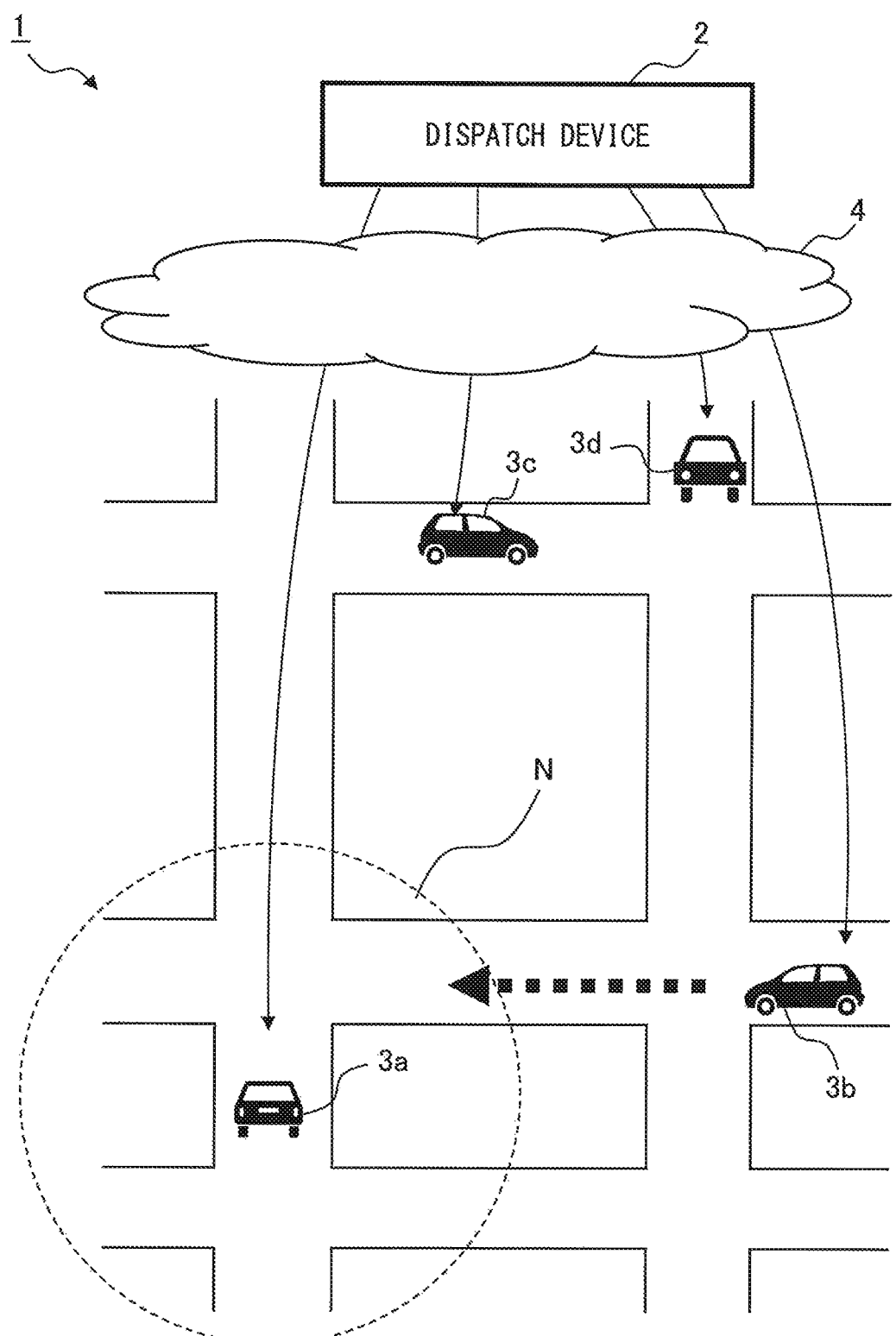
FIG. 1 is a schematic diagram of an operation of a transportation service delivery system.

FIG. 1 is a schematic diagram of an operation of a transportation service delivery system 1.

A transportation service delivery system 1 includes a dispatch device 2 and a plurality of autonomous driving vehicles 3a to 3d (which may be collectively referred to as an "autonomous driving vehicles 3" hereinafter). The autonomous driving vehicles 3 travel along roads toward a destination designated by a dispatch device 2 to provide a transportation service to occupants.

The autonomous driving vehicle 3a is an operating vehicle in which an occupant is riding. The autonomous driving vehicles 3b to 3d are unfilled vehicles with an unoccupied seat. The unfilled vehicle means an autonomous driving vehicle that contains occupants the number of which is less than a riding capacity of the vehicle. Alternatively, only an autonomous driving vehicle 3 without any occupant may be defined as the unfilled vehicle. In an example in FIG. 1, the number of unfilled vehicles is three, however, the number of unfilled vehicles is not limited to three in the present disclosure.

The dispatch device 2 acquires location information of the autonomous driving vehicles 3. The dispatch device 2 dispatches the autonomous driving vehicles 3 so that a predetermined number or higher number of unfilled vehicles are present wound a location of the autonomous driving vehicle 3a. In the example in FIG. 1, the dispatch device 2 dispatches the unfilled autonomous driving vehicle 3b so that the unfilled autonomous driving vehicle 3b is present in an area N around the location of the autonomous driving vehicle 3a. In this manner, even when an autonomous driving vehicle falls into an undrivable condition, the dispatch device 2 can dispatch an unfilled vehicle so that an occupant riding in the autonomous driving vehicle can get into another autonomous driving vehicle without delay.

The dispatch device 2 and the autonomous driving vehicles 3 are connected to a network 4. The network 4 is, for example, the Internet in which communication is made using Transport Control Protocol/Internet Protocol (TCP/IP). Devices that perform communication via the network 4 are connected by a wire or wirelessly. A wireless connection may be a connection by means of, for example, a wireless LAN (Local Area Network) standard such as IEEE (the Institute of Electrical and Electronics Engineers) 802.11ac. Alternatively, the wireless connection may be a connection by means of a wireless WAN (Wide Area Network) such as a 4th Generation (4G) line or a 5th Generation (5G) line.

Figure 2:
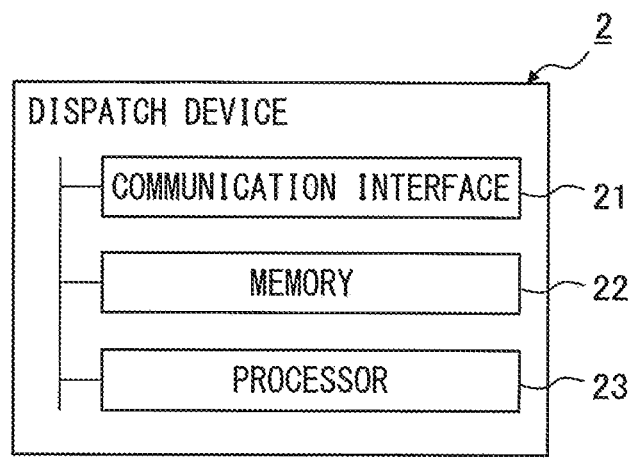
FIG. 2 is a schematic diagram of hardware of a dispatch device.

FIG. 2 is a schematic diagram of hardware of the dispatch device.

The dispatch device 2 connects to the autonomous driving vehicle 3 and acquires location information indicating a location of the autonomous driving vehicle 3 and occupant information indicating a status of an occupant riding in the autonomous driving vehicle 3. In addition, the dispatch device 2 dispatches the autonomous driving vehicle 3 in accordance with the received location information and occupant information. For this purpose, the dispatch device 2 includes a communication interface 21, a memory 22, and a processor 23.

The communication interface 21 is an example of a dispatch communication unit. The communication interface 21 is a communication interface circuit for connecting the dispatch device 2 to the network 4. The communication interface 21 supplies the processor 23 with data received from the autonomous driving vehicle 3 via the network 4. In addition, the communication interface 21 transmits data supplied from the processor 23 to the autonomous driving vehicle 3 via the network 4.

The memory 22 is an example of a dispatch storage unit. The memory 22 is, for example, at least one of a semiconductor memory, a magnetic disc device, and an optical disc device. The memory 22 stores a driver program, an operating system program, an application program, data, etc., used in processing by the processor 23. For example, the memory 22 stores, as a driver program, a driver program for a communication device that controls the communication interface 21, etc. Various programs may be installed on the memory 22 from a computer-readable removable recording medium using a publicly known setup program, etc. The computer-readable removable recording medium is, for example, a Compact Disc Read-Only Memory (CD-ROM), a DVD Read-Only Memory (DVD-ROM), etc. The memory 22 also stores various data required for dispatching an autonomous driving vehicle such as a riding capacity, the number of occupants in the vehicle, and a current location with respect to each autonomous driving vehicle 3.

The processor 23 is an example of a dispatch processing unit. The processor 23 is composed of one or more processors and a peripheral circuit thereof. The processor 23 controls an overall operation of the dispatch device 2 in an integrated manner and is, for example, a central processing unit (CPU). The processor 23 controls, in such a way that various processes for the dispatch device 2 are performed in accordance with a program, etc. stored in the memory 22 by means of an appropriate means, an operation of the communication interface 21, etc. The processor 23 performs the processes in accordance with the program (the operating system program, the driver program, the application program, etc.) stored in the memory 22. The processor 23 can also execute a plurality of programs (application programs, etc.) in parallel.

Figure 3:
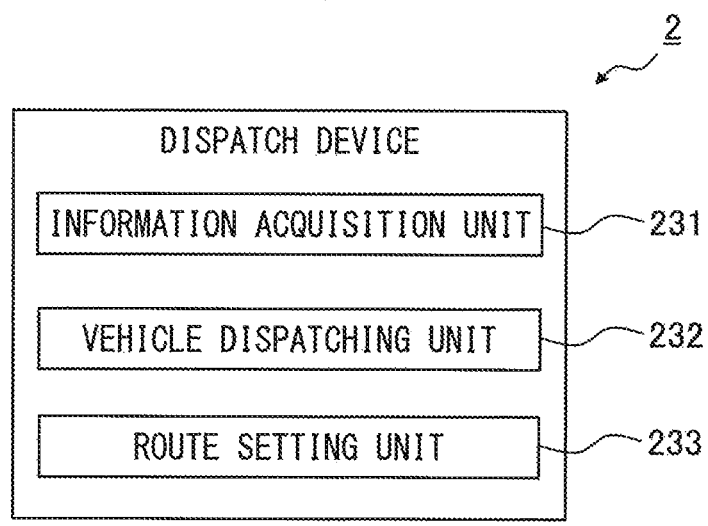
FIG. 3 is a functional block diagram of the dispatch device.

FIG. 3 is a functional block diagram of the dispatch device.

The dispatch device 2 includes, as functional blocks, an information acquisition unit 231, a vehicle dispatching unit 232, and a route setting unit 233. Each of the units included in the dispatch device 2 is a functional module implemented in a form of a program executed by the processor 23. Alternatively, each of the units included in the dispatch device 2 may be implemented in a form of a separate integrated circuit, a microprocessor, or firmware.

The information acquisition unit 231 acquires through the communication interface 21, for each of the autonomous driving vehicles 3, location information and occupant information of the autonomous driving vehicle. The information acquisition unit 231 stores the acquired location information and occupant information in the memory 22 in association with each other. The location information is information for identifying the location of the autonomous driving vehicle 3, for example, longitude and latitude. The occupant information is information on an occupant riding in the autonomous driving vehicle 3, and includes an occupant count, which is the number of occupants riding in the autonomous driving vehicle 3. The occupant information may include a destination of the occupant or needs specific to the occupant. Acquisition of the location information and the occupant information by the autonomous driving vehicle 3 will be described later. The information acquisition unit 231 may also acquire, with respect to the autonomous driving vehicle 3, information other than the location information, such as a speed or a condition of the vehicle.

The vehicle dispatching unit 232 dispatches, on the basis of the location information and the occupant information of the autonomous driving vehicles, an unfilled vehicle, which is the autonomous driving vehicle 3 in which an occupant can ride. Specifically, the vehicle dispatching unit 232 identifies, on the basis of the occupant information acquired by the information acquisition unit 231, an operating vehicle and an unfilled vehicle. The vehicle dispatching unit 232 then identifies a reference vehicle, which is the operating vehicle serving as a reference in dispatching the unfilled vehicle. Subsequently, the vehicle dispatching unit 232 identifies, on the basis of the location information of the identified unfilled vehicle, a dispatched vehicle, which is the unfilled vehicle to be dispatched. Next, the vehicle dispatching unit 232 generates location designation information that designates a location of the dispatched vehicle and transmits the designated location information to the dispatched vehicle through the communication interface 21.

The vehicle dispatching unit 232 identifies an autonomous driving vehicle for which the occupant count contained in the acquired occupant information is one or more as an operating vehicle.

The vehicle dispatching unit 232 obtains a value, for each autonomous driving vehicle 3, by subtracting the occupant count contained in the acquired occupant information from the riding capacity stored in the memory 22, and identifies an autonomous driving vehicle 3 for which the obtained value is positive as an unfilled vehicle. In this case, the autonomous driving vehicle 3 with the occupant count less than the riding capacity may be identified as the operating vehicle and as the unfilled vehicle.

In addition, the vehicle dispatching unit 232 may identify the autonomous driving vehicle 3 for which the occupant count contained in the acquired occupant information is zero as the unfilled vehicle. In this case; a plurality of autonomous driving vehicles 3 may be identified as either the operating vehicle or the unfilled vehicle.

The vehicle dispatching unit 232 identifies a reference vehicle from operating vehicles in a predetermined order. The order is determined on the basis of a vehicle identifier used in identification of autonomous driving vehicles 3 in the transportation service delivery system 1, an attribute of each autonomous driving vehicle 3 (such as usage, dimensions, a state of the vehicle such as "in operation", "waiting", or "under inspection", etc.) stored in the memory 22 in association with the vehicle identifier, a geographical position of the vehicle, an arrival time at the destination, a distance to the nearest unfilled vehicle, etc. The vehicle dispatching unit 232 may identify the reference vehicle in an order determined by taking all or part of these and other items into account. Alternatively, as long as an objective of service delivery by the transportation service delivery system 1 is fulfilled, the vehicle dispatching unit 232 may identify the reference vehicle in a random order.

The vehicle dispatching unit 232 calculates for each of the unfilled vehicles, on the basis of the acquired location information, a distance to the reference vehicle or a travel time, which is an amount of time required to move to an area within a certain distance from a location of the reference vehicle. The vehicle dispatching unit 232 then identifies an unfilled vehicle for which the distance to the reference vehicle or the travel time to the location of the reference vehicle is minimum as the unfilled vehicle to be dispatched, i.e., the dispatched vehicle. The vehicle dispatching unit 232 may identify a plurality of unfilled vehicles as the dispatched vehicles.

The vehicle dispatching unit 232 may identify an unfilled vehicle other than the unfilled vehicle for which the distance to the reference vehicle or the travel time to the location of the reference vehicle is minimum as the dispatched vehicle. For example, the vehicle dispatching unit 232 may identify an unfilled vehicle waiting in a vehicle waiting area as the dispatched vehicle. The vehicle waiting area is a place, similarly to a taxi waiting area in front of a station, where unfilled vehicles may wait in preparation for an expected dispatch request, and a location of the area is stored in the memory 22 in advance. The vehicle dispatching unit 232 may identify an unfilled vehicle, among unfilled vehicles traveling in the same direction as the reference vehicle, for which the distance to the reference vehicle or the travel time to the location of the reference vehicle is minimum as the dispatched vehicle. Alternatively, the vehicle dispatching unit 232 may identify an unfilled vehicle the destination of which is closest to the destination of the reference vehicle as the dispatched vehicle.

Alternatively, the vehicle dispatching unit 232 may identify an unfilled vehicle, in accordance with priority determined on the basis of the number of occupants riding in the unfilled vehicle or other conditions, as the dispatched vehicle. For example, an unfilled vehicle with no occupant riding in the vehicle is given higher priority than an unfilled vehicle with one or more occupants riding in the vehicle. In this case, when there is an unfilled vehicle with no occupant riding in the vehicle, the unfilled vehicle with no occupant riding in the vehicle may be identified as the dispatched vehicle. When there is no unfilled vehicle with no occupant riding in the vehicle, the unfilled vehicle with one or more occupants riding in the vehicle may be identified as the dispatched vehicle.

The vehicle dispatching unit 232 generates location designation information that designates the location of the dispatched vehicle so that the dispatched vehicle is present around the reference vehicle.

The vehicle dispatching unit 232 generates the location designation information that designates a location within a predetermined range from the location of the reference vehicle as the location of the dispatched vehicle. Alternatively, the vehicle dispatching unit 232 may generate the location designation information that designates a location within a predetermined range from the location of the reference vehicle after a certain amount of time as the location of the dispatched vehicle after the certain amount of time.

Thus, the vehicle dispatching unit 232 can dispatch the unfilled vehicle on the basis of the vehicle information and the occupant information of the autonomous driving vehicle 3 and in accordance with a real-time traffic situation or an environmental burden, and optimize a travel route and a travel plan of the autonomous driving vehicle 3.

The route setting unit 233 sets, for each of the autonomous driving vehicles 3, a travel route from a current location of the vehicle to the destination indicating expected locations of the vehicle at certain times. The route setting unit 233 may set the travel route by reflecting a real-time environmental situation (traffic situation, weather, etc.).

The route setting unit 233 performs route search in accordance with a predetermined route search program. The predetermined route search program is, for example, a program that searches for a route by means of the Dijkstra's algorithm.

Figure 4:
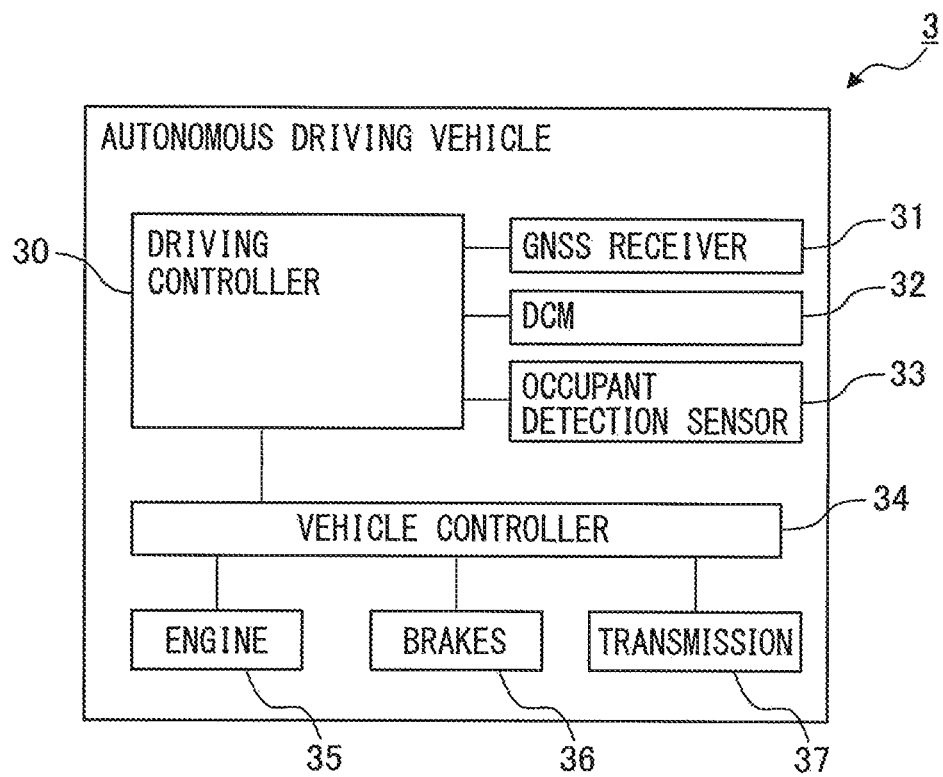
FIG. 4 is a schematic diagram of hardware of an autonomous driving vehicle.

FIG. 4 is a schematic diagram of hardware of the autonomous driving vehicle.

The autonomous driving vehicle 3 includes a driving controller 30, a global navigation satellite system (GNSS) receiver 31 that receives a signal transmitted from a GNSS satellite to identify a current location of the vehicle, a data communication module (DCM) 32, and a sensor that detects an occupant or an occupant information collection device (hereinafter, referred to as an "occupant detection sensor") 33. The autonomous driving vehicle 3 also includes a vehicle controller 34, an engine or an electric vehicle (EV) system (hereinafter, referred to as an "engine") 35, a deceleration device such as brakes or an energy regeneration device (hereinafter, referred to as "brakes") 36, and a transmission 37.

The driving controller 30 transmits the location information of the autonomous driving vehicle 3 acquired by the GNSS receiver 31 to the dispatch device 2 through the data communication module 32. The driving controller 30 requests, on the basis of a driving control signal received through the data communication module 32, restriction on traveling from the vehicle controller 34. A detailed configuration of the driving controller 30 will be described later.

The GNSS receiver 31 identifies the current location on the basis of the signal received from the GNSS satellite. The GNSS receiver 31 is connected to the driving controller 30, and the driving controller 30 can detect the current location of the autonomous driving vehicle 3 by means of the GNSS receiver 31. The GNSS receiver 31 may identify the current location of the vehicle by means of a technique other than a satellite positioning system, for example, simultaneous location and mapping (SLAM) using a database based on features of images acquired by an image sensor or SLAM using a spatial distribution database of features acquired by light detection and ranging (LIDAR), radio detection and ranging (RADAR), etc.

The data communication module 32 includes a communication interface for connecting to the network 4. The data communication module 32 performs communication with an external device such as the dispatch device 2. The data communication module 32 is connected to the driving controller 30, therefore, the driving controller 30 can transmit and receive, to/from a device connected to the network 4 such as the dispatch device 2 through the data communication module 32, data such as real-time data, past statistical data, or future forecast data.

The occupant detection sensor 33 is a weight sensor mounted on each seat of the autonomous driving vehicle 3. In this case, the driving controller 30 detects, on the basis of weight detected by the occupant detection sensor 33, whether or not an occupant is riding in the autonomous driving vehicle 3. Alternatively, the occupant detection sensor 33 may be a camera for capturing an image of the inside of a passenger compartment of the autonomous driving vehicle 3 or a sensor for detecting a heart rate of the occupant. For example, when the occupant detection sensor 33 is a camera, the driving controller 30 detects, for example, by inputting an image output by the occupant detection sensor 33 to a classifier that has performed learning in advance so as to detect a human being represented on the image, whether or not an occupant is riding in the autonomous driving vehicle 3.

The vehicle controller 34 is connected to the engine 35, the brakes 36, and the transmission 37 of the autonomous driving vehicle 3 through the communication interface, and electronically controls operations of the engine 35, the brakes 36, and the transmission 37 of the autonomous driving vehicle 3. The vehicle controller 34 is installed in the autonomous driving vehicle 3 as an electronic control unit (ECU). The vehicle controller 34 may be achieved by a plurality of processors or may be achieved by a dedicated circuit.

The vehicle controller 34 is connected to the driving controller 30. The driving controller 30 requests the vehicle controller 34 to cause the autonomous driving vehicle 3 to travel toward the destination. The vehicle controller 34 controls, in accordance with the request from the driving controller 30, the operations of the engine 35, etc. of the autonomous driving vehicle 3 to cause the autonomous driving vehicle 3 to travel toward the destination.

Figure 5:
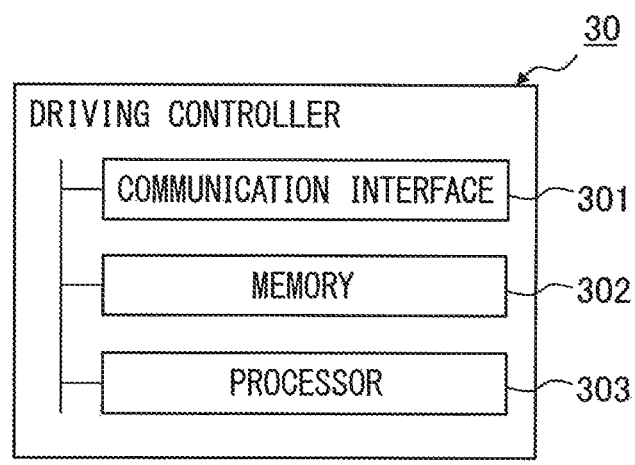
FIG. 5 is a diagram illustrating a schematic configuration of a driving controller.

FIG. 5 is a schematic diagram of hardware of the driving controller.

The driving controller 30 includes a communication interface 301, a memory 302, and a processor 303. The driving controller 30 is installed in the autonomous driving vehicle 3 as an ECU.

The communication interface 301 is a communication interface circuit for connecting to other devices installed in the autonomous driving vehicle 3 such as the driving controller 30, the GNSS receiver 31, the data communication module 32, the occupant detection sensor 33, or the vehicle controller 34. The communication interface 301 supplies the processor 303 with data received from other devices. In addition, the communication interface 301 transmits data supplied from the processor 303 to other devices.

The memory 302 stores an identifier that uniquely identifies the autonomous driving vehicle 3. The memory 302 supplies, in response to a request from the processor 303, the processor 303 with the identifier. The memory 302 may also store data used in processing performed by the processor 303.

The processor 303 performs an operation on the basis of a signal supplied from the communication interface 301 and outputs a signal to the communication interface 301. The processor 303 performs the operation by executing a predetermined program.

Figure 6:
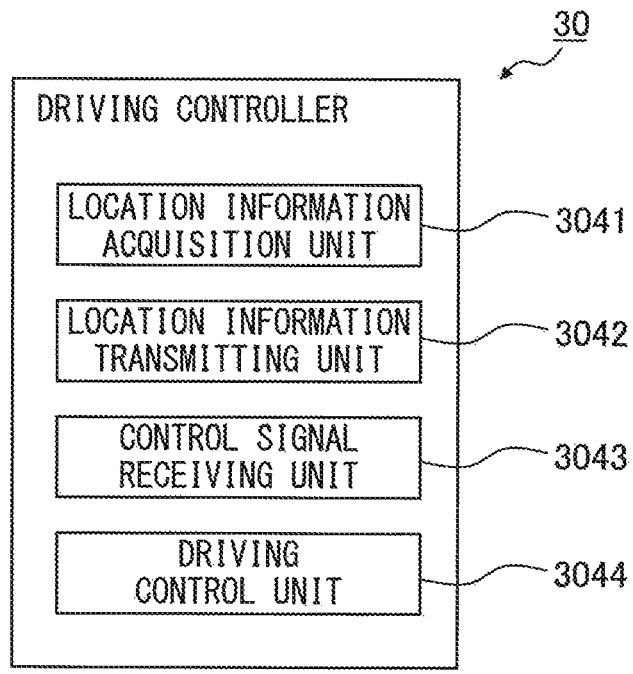
FIG. 6 is a functional block diagram of the driving controller.

FIG. 6 is a functional block diagram of the driving controller.

The driving controller 30 includes, as functional blocks, a location information acquisition unit 3041, a location information transmitting unit 3042, a control signal receiving unit 3043, and a driving control unit 3044. Each of the units included in the driving controller 30 is a functional module implemented in a form of a program executed by the processor 303. Alternatively, each of the units included in the driving controller 30 may be achieved by a dedicated circuit.

The location information acquisition unit 3041 acquires information on the current location of the autonomous driving vehicle 3 at predetermined time intervals (e.g., every one minute) from the GNSS receiver 31 through the communication interface 301. The location information acquisition unit 3041 may also acquire, in response to a location information request received from the information acquisition unit 231 of the dispatch device 2, information on the current location.

The location information transmitting unit 3042 transmits the information on the current location acquired by the location information acquisition unit 3041 along with the identifier stored in the memory 302 to the dispatch device 2 through the communication interface 301 and the data communication module 32.

The control signal receiving unit 3043 receives, from the dispatch device 2 through the data communication module 32, location designation information that designates a location of the vehicle. The location designation information is transmitted from the dispatch device 2 when a destination is newly set or modified. The location designation information may be a travel route set by the route setting unit 233 of the dispatch device 2.

The driving control unit 3044 transmits data to the vehicle controller 34 on the basis of the received location designation information, and controls driving so that the location of the vehicle coincides with the location designated by the location designation information.

Figure 7:
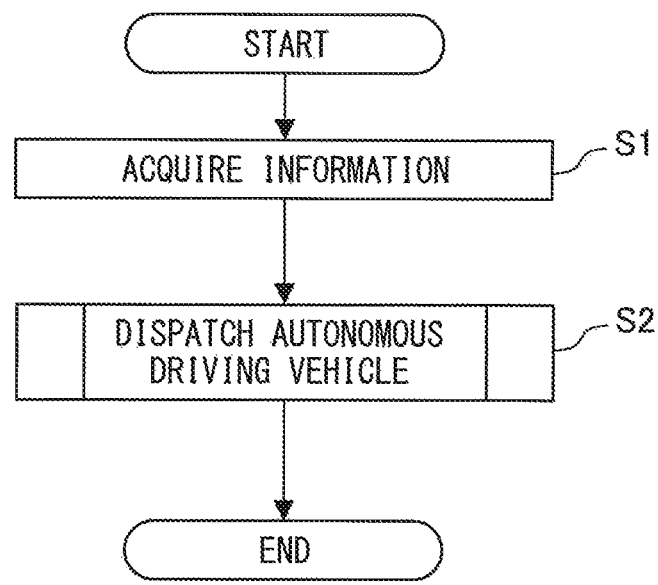
FIG. 7 is a process flowchart for the dispatch device.

FIG. 7 is a process flowchart for the dispatch device. The dispatch device performs processes illustrated by the flowchart in FIG. 7 at predetermined periods (e.g., every 10 minutes).

First, the information acquisition unit 231 acquires through the communication interface 21, for each of the autonomous driving vehicles 3, location information and occupant information (step S1). The location information is information indicating the location of the autonomous driving vehicle 3. The occupant information is information indicating a status of an occupant riding in the autonomous driving vehicle. The processor 23 stores the acquired location information in the memory 22.

The vehicle dispatching unit 232 then performs an autonomous driving vehicle dispatching process (step S2). The autonomous driving vehicle dispatching process is a process in which an unfilled vehicle is dispatched in such a way that a predetermined number or higher number of unfilled vehicles are present around a location of an operating vehicle. Details of the autonomous driving vehicle dispatching process will be described later. After performing the autonomous driving vehicle dispatching process, the dispatch device 2 ends processing.

Figure 8:
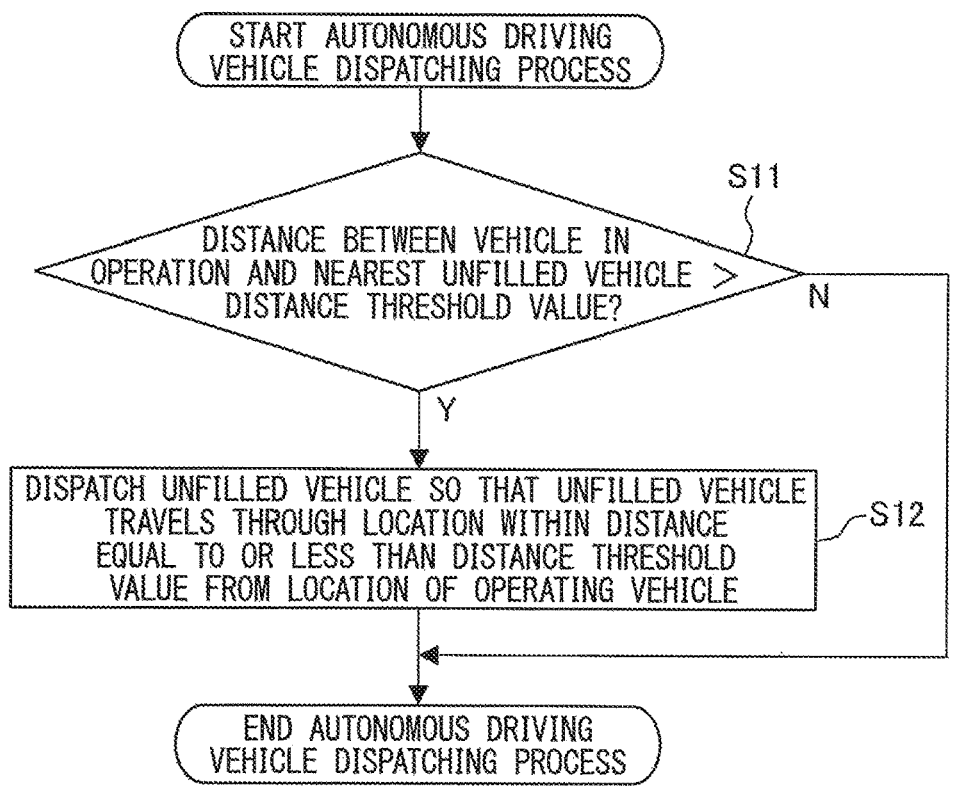
FIG. 8 is a first process flowchart of an autonomous driving vehicle dispatching process for the dispatch device.

FIG. 8 is a first process flowchart of the autonomous driving vehicle dispatching process for the dispatch device.

In the first process flowchart, the vehicle dispatching unit 232 designates a location of the unfilled vehicle on the basis of locations of the operating vehicle and the unfilled vehicle at a certain time, and dispatches the unfilled vehicle.

When the autonomous driving vehicle dispatching process (step S2) is started, the vehicle dispatching unit 232 determines, with respect to the operating vehicle, whether or not a distance to the nearest unfilled vehicle is greater than a distance threshold value (step S11). The distance threshold value is a numerical value appropriately set by an administrator of the dispatch device 2.

When it is determined that the distance between the operating vehicle and the nearest unfilled vehicle is greater than the distance threshold value (step S11: Y), the vehicle dispatching unit 232 dispatches unfilled vehicles so that at least one of the unfilled vehicles travels through a location within a distance equal to or less than the distance threshold value from the location of the operating vehicle (step S12). For example, the vehicle dispatching unit 232 designates, as the location of the identified dispatched vehicle, a location within a distance equal to or less than the distance threshold value from the location of the operating vehicle. Then, the vehicle dispatching unit 232 ends the autonomous driving vehicle dispatching process.

The dispatched vehicle may be an unfilled vehicle closest to the operating vehicle, however, the dispatched vehicle is not limited to such a vehicle. For example, when the nearest unfilled vehicle is traveling in a direction moving away from the operating vehicle and another unfilled vehicle is traveling in a direction moving closer to the operating vehicle, the another unfilled vehicle may be dispatched.

When it is determined that the distance between the operating vehicle and the nearest unfilled vehicle is equal to or less than the distance threshold value (step S11: N), the vehicle dispatching unit 232 ends the autonomous driving vehicle dispatching process.

The vehicle dispatching unit 232 may identify the dispatched vehicle on the basis of the travel time, which is an amount of time required for an unfilled vehicle to move to an area within a distance equal to or less than the distance threshold value from the location of the operating vehicle, instead of the distance to the operating vehicle, and designate the location of the dispatched vehicle. In this case, the vehicle dispatching unit 232 determines, in step S11, whether or not an unfilled vehicle is traveling at a location for which the travel time from the location of the operating vehicle is equal to or less than the travel time threshold value. The vehicle dispatching unit 232 then identifies, in step S12, an unfilled vehicle for which the travel time is minimum as the dispatched vehicle. In addition, the vehicle dispatching unit 232 designates, in step S12, a location for which the travel time from the location of the operating vehicle is equal to or less than the travel time threshold value as the location of the identified dispatched vehicle.

The vehicle dispatching unit 232 may identify one of a plurality of operating vehicles after another as the reference vehicle and dispatch an unfilled vehicle, in accordance with the first process flowchart illustrated in FIG. 8, for each operating vehicle as the reference.

The vehicle dispatching unit 232 may perform the autonomous driving vehicle dispatching process in a different manner from the first process flowchart illustrated in FIG. 8.

Figure 9:
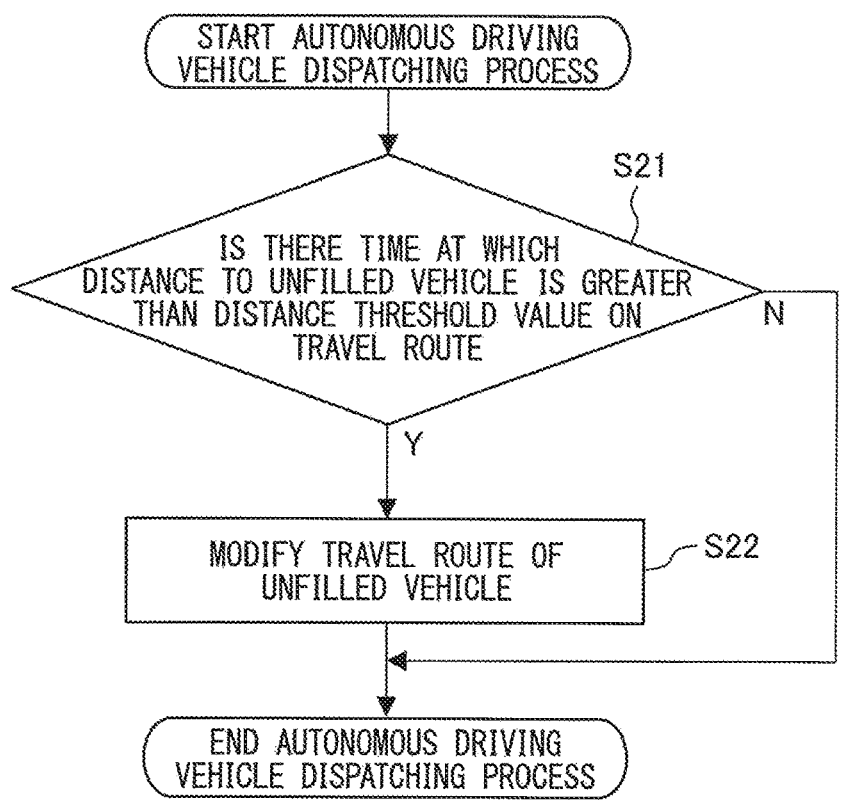
FIG. 9 is a second process flowchart of the autonomous driving vehicle dispatching process for the dispatch device.

FIG. 9 is a second process flowchart of the autonomous driving vehicle dispatching process for the dispatch device.

In the second process flowchart, the vehicle dispatching unit 232 modifies the travel route of the unfilled vehicle on the basis of the distance to the unfilled vehicle on the travel route of the operating vehicle, and dispatches the unfilled vehicle.

When the autonomous driving vehicle dispatching process (step S2) is started, the vehicle dispatching unit 232 performs processing in the second process flowchart instead of the processing in the first process flowchart. First, the vehicle dispatching unit 232 determines whether or not there is a time at which a distance to the unfilled vehicle is greater than the distance threshold value on the travel route of the operating vehicle (step S21). The travel route of the operating vehicle is information indicating expected locations of the vehicle at certain times from the current location of the vehicle to the destination, and is set by the route setting unit 233.

Figure 10:
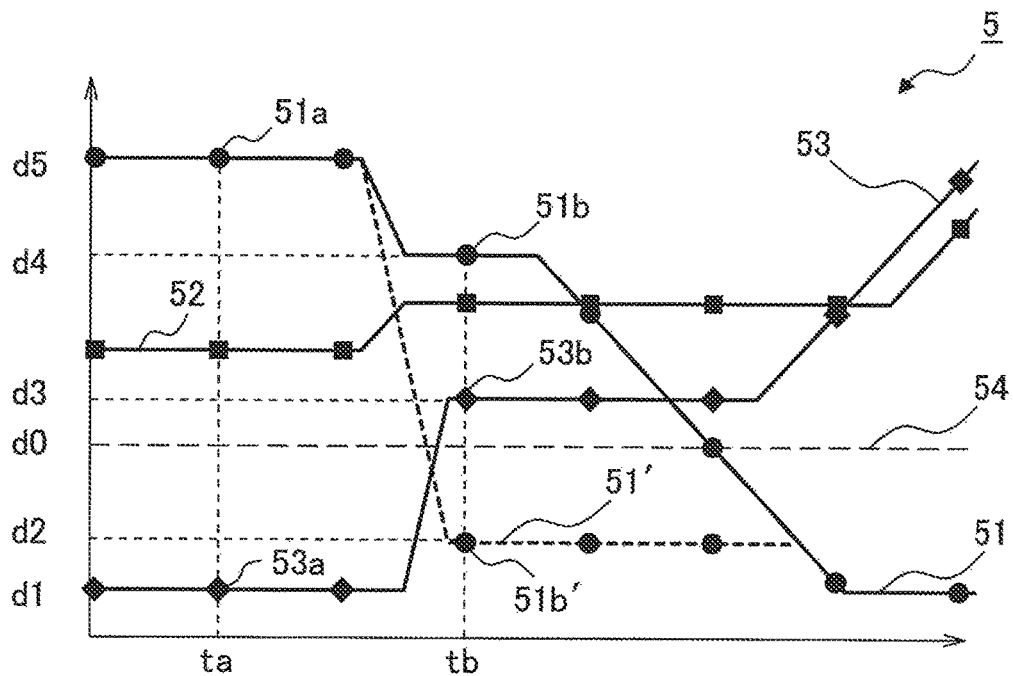
FIG. 10 is a graph illustrating temporal variations in distances between an autonomous driving vehicle and other vehicles.

FIG. 10 is a graph illustrating temporal variations in distances between an autonomous driving vehicle and other vehicles.

In the graph 5, a horizontal axis represents a lapse of time while a vertical axis represents a distance to the location of the autonomous driving vehicle 3a, which is the operating vehicle. Series 51 to 53 indicate expected distances to the autonomous driving vehicle 3a at certain times on the travel routes of the autonomous driving vehicles 3b to 3d, each of which is an unfilled vehicle. For example, at a data point 51a of the series 51, it is expected that the distance between the autonomous driving vehicle 3b and the autonomous driving vehicle 3a will be d5 at time ta. A reference line 54 indicates a distance threshold value d0 used for defining an area within a certain distance from the autonomous driving vehicle 3a.

At time ta, as indicated by a data point 53a of the series 53, the distance between the autonomous driving vehicle 3d closest to the autonomous driving vehicle 3a and the autonomous driving vehicle 3a is d1 and is not greater than the distance threshold value d0.

At time tb, a distance d3 for a data point 53b of the series 53 is smaller than corresponding distances for data points of the series 51 and 52. In contrast, the distance d3 between the autonomous driving vehicle 3d closest to the autonomous driving vehicle 3a and the autonomous driving vehicle 3a is greater than the distance threshold value d0. Consequently, in an example of graph 5, it is determined that there is a time at which the distances to the unfilled vehicles are greater than the distance threshold value on the travel route of the operating vehicle.

Referring back to FIG. 9, when it is determined that there is a time at which the distance to the unfilled vehicle is greater than the distance threshold value on the travel route of the operating vehicle (step S21: Y), the vehicle dispatching unit 232 modifies the travel route of the unfilled vehicle (step S22) and ends the autonomous driving vehicle dispatching process. In this case, the vehicle dispatching unit 232 modifies the travel route of the unfilled vehicle so that the location of the unfilled vehicle traveling through a location closest to the location of the operating vehicle at the time is changed to a location within a distance equal to or less than the distance threshold value from the location of the operating vehicle.

In an example of FIG. 10, the location of the autonomous driving vehicle 3d traveling through the location closest to the location of the autonomous driving vehicle 3a at time tb is at a distance greater than the distance threshold value d0 from the location of the operating vehicle. Therefore, the vehicle dispatching unit 232 modifies the travel routes of the autonomous driving vehicles 3b to 3d, so that there is an unfilled vehicle that will travel through a location within a distance equal to or less than the distance threshold value from the location of the operating vehicle.

In the example of FIG. 10, the travel route of the autonomous driving vehicle 3b is modified. The series 51' is the series corresponding to the distance to the autonomous driving vehicle 3a on the modified travel route of the autonomous driving vehicle 3b. The travel route of the autonomous driving vehicle 3b is modified from a route covering a data point 51b at which the route passes a location at a distance d4 from the autonomous driving vehicle 3a at time tb to a route covering a data point 51b' at which the route passes a location at a distance d2 from the autonomous driving vehicle 3a. Since the distance d2 is equal to or less than the distance threshold value d0, the vehicle dispatching unit 232 can dispatch the autonomous driving vehicle 3 so that the autonomous driving vehicle 3b, which is an unfilled vehicle, is present around the location of the autonomous driving vehicle 3a, which is the operating vehicle.

Referring back to FIG. 9, when it is determined that there is not a time at which the distance to the unfilled vehicle is greater than the distance threshold value on the travel route of the operating vehicle (step S21: N), the vehicle dispatching unit 232 ends the autonomous driving vehicle dispatching process.

The vehicle dispatching unit 232 may designate the location of the unfilled vehicle on the basis of the travel time, which is an amount of time required for the unfilled vehicle to move to an area within a distance equal to or less than the distance threshold value from the location of the operating vehicle, instead of the distance to the operating vehicle. In this case, the vehicle dispatching unit 232 determines, in step S21, whether or not there is a time at which the minimum travel time from the location of the unfilled vehicle is greater than the travel time threshold value on the travel route of the operating vehicle. The vehicle dispatching unit 232 then designates, in step S22, a location for which the minimum travel time from the location of at least one unfilled vehicle is equal to or less than the travel time threshold value as the location of the unfilled vehicle.

The vehicle dispatching unit 232 may identify one of a plurality of operating vehicles after another as the reference vehicle and dispatch an unfilled vehicle, in accordance with the second process flowchart illustrated in FIG. 9, for each operating vehicle as the reference.

Furthermore, the vehicle dispatching unit 232 may perform the autonomous driving vehicle dispatching process in a still different manner.

Figure 11:
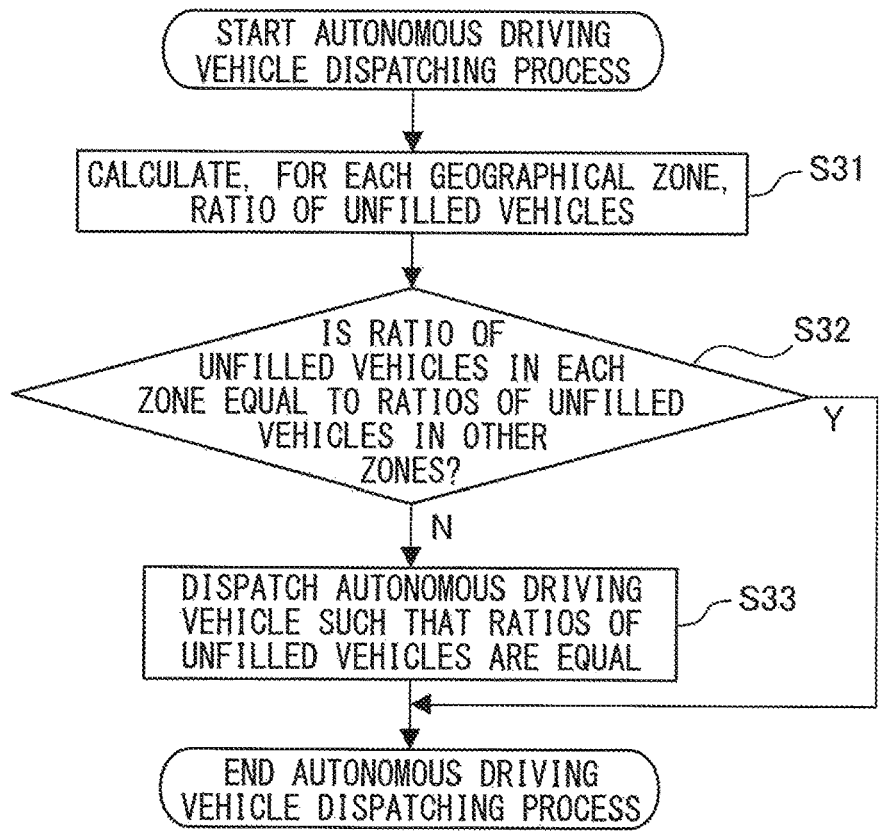
FIG. 11 is a third process flowchart of the autonomous driving vehicle dispatching process for the dispatch device.

FIG. 11 is a third process flowchart of the autonomous driving vehicle dispatching process for the dispatch device.

In the third process flowchart, the vehicle dispatching unit 232 designates a location of the unfilled vehicle on the basis of a ratio of the number of unfilled vehicles to the number of the autonomous driving vehicles 3 in each geographical zone, and dispatches the unfilled vehicle.

When the autonomous driving vehicle dispatching process (step S2) is started, the vehicle dispatching unit 232 performs processing in the third process flowchart instead of the processing in the first process flowchart. First, the vehicle dispatching unit 232 calculates, for each of a plurality of geographical zones, a ratio of the number of unfilled vehicles to the number of the autonomous driving vehicles 3 traveling in the zone (step S31).

Figure 12:
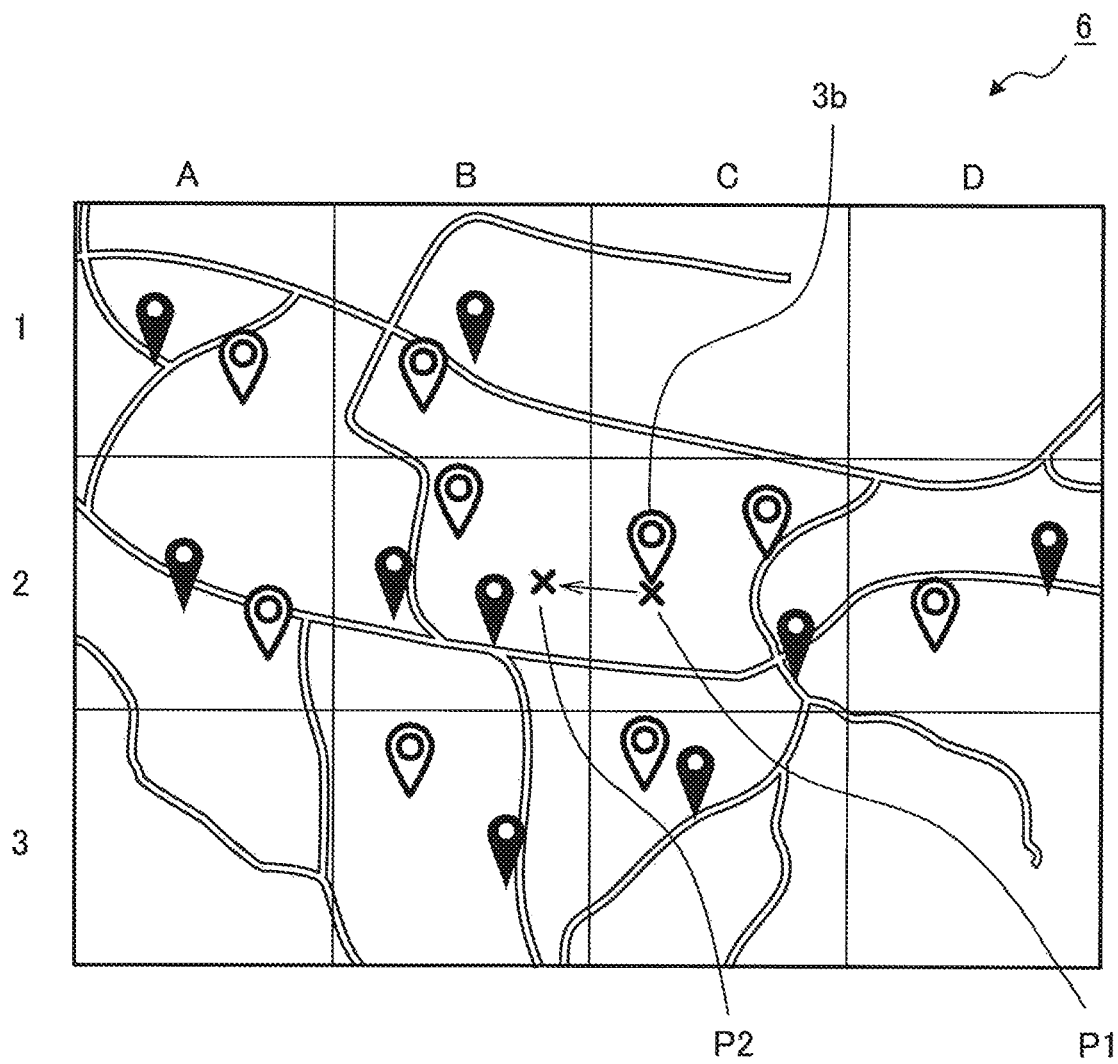
FIG. 12 is a diagram illustrating locations of vehicles in each geographical zone.

FIG. 12 is a diagram illustrating locations of vehicles in each geographical zone.

The geographical range illustrated in map 6 is divided into 12 zones of A1 to D3 on the basis of latitude and longitude. In the map, a black marker indicates a location of an operating vehicle while a white marker indicates a location of an unfilled vehicle.

The number of autonomous driving vehicles traveling in the zone A1 is two and the number of unfilled vehicles of the autonomous driving vehicles is one, therefore, the ratio of the unfilled vehicle is 50%. The number of autonomous driving vehicles traveling in the zone B2 is three and the number of unfilled vehicles of the autonomous driving vehicles is one, therefore, the ratio of the unfilled vehicle is 33%. The number of autonomous driving vehicles traveling in the zone C2 is three and the number of unfilled vehicles of the autonomous driving vehicles is two, therefore, the ratio of the unfilled vehicle is 67%.

Referring back to FIG. 11, the vehicle dispatching unit 232 determines whether or not the ratio of the unfilled vehicles in one zone is equal to a ratio of the unfilled vehicles in another zone (step S32).

When it is determined that the ratio of the unfilled vehicles in one zone is not equal to the ratio of the unfilled vehicles in another zone (step S32:N), the vehicle dispatching unit 232 dispatches an autonomous driving vehicle (step S33) and ends the autonomous driving vehicle dispatching process. In step S33, the vehicle dispatching unit 232 dispatches the autonomous driving vehicle so that the ratio of the unfilled vehicles in the one zone is equal to the ratio of the unfilled vehicles in the another zone.

In an example illustrated in FIG. 12, the ratios of the unfilled vehicles in zones A1, B2, and C2 are 50%, 33%, and 67%, respectively, and not equal to each other. The vehicle dispatching unit 232 transmits, to an unfilled vehicle 3b that will travel through a location P1 in the zone C2 through the communication interface 21, location designation information that designates a location P2 in the zone B2. Accordingly, the unfilled vehicle 3b moves from the zone C2 to the zone B2, thereby making each of the ratios of the unfilled vehicles in the zone B2 and the zone C2 50% and equal to the ratios in other zones.

Referring back to FIG. 11, when it is determined that the ratio of the unfilled vehicles in one zone is equal to the ratio of the unfilled vehicles in another zone (step S32:Y), the vehicle dispatching unit 232 ends the autonomous driving vehicle dispatching process.

Furthermore, the vehicle dispatching unit 232 may perform the autonomous driving vehicle dispatching process in a still yet different manner.

FIG. 13 is a fourth process flowchart of the autonomous driving vehicle dispatching process for the dispatch device.

First, the vehicle dispatching unit 232 calculates the travel time between the location of each operating vehicle and the location of each unfilled vehicle (step S41).

The vehicle dispatching unit 232 then identifies, for each operating vehicle, an unfilled vehicle for which the travel time is minimum as the nearest unfilled vehicle (step S42). In this case, when an unfilled vehicle is identified as the nearest unfilled vehicle for a plurality of operating vehicles, the unfilled vehicle is identified as the nearest unfilled vehicle for the operating vehicle for which the travel time from the location of the unfilled vehicle is minimum.

Next, the vehicle dispatching unit 232 determines whether or not the travel time between the location of each operating vehicle and the location of the corresponding nearest unfilled vehicle is greater than the travel time threshold value (step S43).

When it is determined that the travel time between the location of each operating vehicle and the location of the corresponding nearest unfilled vehicle is not greater than the travel time threshold value (step S43: N), the vehicle dispatching unit 232 does not do anything to the nearest unfilled vehicle.

When it is determined that the travel time between the location of each operating vehicle and the location of the corresponding nearest unfilled vehicle is greater than the travel time threshold value (step S43: Y), the vehicle dispatching unit 232 designates a location for which the travel time from the location of the operating vehicle is within the travel time threshold value as the location of the nearest unfilled vehicle (step S44).

The vehicle dispatching unit 232 performs processing in step S43 for each operating vehicle and ends the autonomous driving vehicle dispatching process.

It should be understood that those skilled in the art may make various changes, substitutions, and alterations to embodiments described above without departing from the spirit and scope of the present disclosure.

REFERENCE SIGNS LIST

1 Transportation service delivery system
2 Dispatch device
231 Information acquisition unit
232 Vehicle dispatching unit
233 Route setting unit
3, 3a to 3d Autonomous driving vehicle

The invention claimed is:

1. A dispatch device comprising:
a communication interface circuit, and
a processor configured to:
    acquire via the communication interface circuit, for each of a plurality of vehicles, location information indicating a location of the vehicle and loaded object information indicating a status of an object of transportation loaded on the vehicle,
    compare a current location of an operating vehicle with current locations of unfilled vehicles;
    compare a current traveling direction of the operating vehicle with current traveling directions of the unfilled vehicles;
    select an unfilled vehicle among the unfilled vehicles traveling based on comparison of the current location of the operating vehicle with the current locations of the unfilled vehicles and comparison of the current traveling direction of the operating vehicle with the current traveling directions of the unfilled vehicles, and
    dispatch the selected unfilled vehicle that can carry an object of transportation so that the selected unfilled vehicle is present around a location of the operating vehicle that is carrying an object of transportation,
wherein the processor is further configured to:
    determine whether an amount of time required for each of the plurality of vehicles to move to an area within a distance equal to or less than a distance threshold value from the location of the operating vehicle is greater than a travel time threshold, and
    in response to determining that the amount of time required for each of the plurality of vehicles to move to the area within the distance equal to or less than the distance threshold value from the location of the operating vehicle is greater than the travel time threshold, modify a travel route of at least one of the unfilled vehicles, so that the at least one of the unfilled vehicles travels through a location for which a travel time from the location of the operating vehicle is equal to or less than the travel time threshold value.

2. The dispatch device according to claim 1,
wherein the processor is further configured to:
    dispatch, in dispatching the unfilled vehicle, the unfilled vehicle so that, when a distance between a location of the operating vehicle and a location of an unfilled vehicle closest to the location of the operating vehicle is greater than a distance threshold value, at least one of the unfilled vehicles travels through a location within a distance equal to or less than the distance threshold value from the location of the operating vehicle.

3. The dispatch device according to claim 2,
wherein the processor is further configured to:
    set, for each of the plurality of vehicles, a travel route from a current location of the vehicle to a destination indicating expected locations of the vehicle at certain times, and
    modify, in dispatching the unfilled vehicle, when there is a time at which a distance to the unfilled vehicle is greater than the distance threshold value on a travel route of the operating vehicle, the travel route of the unfilled vehicle so that a location of the unfilled vehicle traveling through a location closest to the location of the operating vehicle at the time is changed to a location within a distance equal to or less than the distance threshold value from the location of the operating vehicle.

4. The dispatch device according to claim 1,
wherein the processor is further configured to:
    set, for each of the plurality of vehicles, a travel route from a current location of the vehicle to a destination indicating expected locations of the vehicle at certain times, and
    designate, in dispatching the unfilled vehicle, when there is a time at which a minimum travel time from the location of the unfilled vehicles is greater than the travel time threshold value on the travel route of the operating vehicle, a location at the time for which the minimum travel time from the location of at least one of the unfilled vehicles is not greater than the travel time threshold value as the location of the unfilled vehicle.

5. The dispatch device according to claim 1,
wherein the processor is further configured to:
    dispatch, in dispatching the unfilled vehicle, when the location of the operating vehicle is in a zone of a plurality of geographical zones, the unfilled vehicle so that a ratio of the number of the unfilled vehicles in the zone to the number of the vehicles traveling in the zone is equal to a ratio of the number of the unfilled vehicles in another zone to the number of the vehicles traveling in the another zone.

6. The dispatch device according to claim 1,
wherein the processor is further configured to:
    identify, in dispatching the unfilled vehicle, for each of the operating vehicles, an unfilled vehicle for which a travel time to the location of the operating vehicle is minimum, and designate, as a location of an unfilled vehicle for which the travel time is greater than a travel time threshold value, a location for which the travel time from the location of the operating vehicle corresponding to the unfilled vehicle is equal to or less than the travel time threshold value.

7. The dispatch device according to claim 1, wherein the vehicle is an autonomous driving vehicle.

8. The dispatch device according to claim 1, wherein the processor is further configured to:
  select the unfilled vehicle among the unfilled vehicles based on a comparison of destinations of the unfilled vehicles and a destination of the operating vehicle.

9. The dispatch device according to claim 1, wherein the processor is further configured to:
  select the unfilled vehicle among the unfilled vehicles based on a number of occupants riding in the unfilled vehicles, and
  an unfilled vehicle with no occupant is selected over an unfilled vehicle with one or more occupants.

10. The dispatch device according to claim 1, wherein the processor is further configured to:
  obtain expected travel times of the unfilled vehicles to a location of the operating vehicle; and
  select the unfilled vehicle among the unfilled vehicles further based on the expected travel times.

11. A dispatching method for dispatching a vehicle using a dispatch device, comprising:
  acquiring, by the dispatch device, for each of a plurality of vehicles, location information indicating a location of the vehicle and loaded object information indicating a status of an object of transportation loaded on the vehicle,
  comparing a current location of an operating vehicle with current locations of unfilled vehicles;
  comparing a current traveling direction of the operating vehicle with current traveling directions of the unfilled vehicles;
  selecting an unfilled vehicle among unfilled vehicles traveling in a same direction as an operating vehicle traveling along a road based on the comparison of the current location of the operating vehicle with the current locations of the unfilled vehicles and the comparison of the current traveling direction of the operating vehicle with the current traveling directions of the unfilled vehicles, and
  dispatching, by the dispatch device, the selected unfilled vehicle that can carry an object of transportation so that the selected unfilled vehicle is present around a location of the operating vehicle that is carrying an object of transportation
  wherein the method further comprises:
  determining whether an amount of time required for each of the plurality of vehicles to move to an area within a distance equal to or less than a distance threshold value from the location of the operating vehicle is greater than a travel time threshold, and
  in response to determining that the amount of time required for each of the plurality of vehicles to move to the area within the distance equal to or less than the distance threshold value from the location of the operating vehicle is greater than the travel time threshold, modifying a travel route of at least one of the unfilled vehicles, so that the at least one of the unfilled vehicles travels through a location for which a travel time from the location of the operating vehicle is equal to or less than the travel time threshold value.

12. The dispatching method according to claim 11, wherein:
  the unfilled vehicle is selected among the unfilled vehicles based on a comparison of destinations of the unfilled vehicles and a destination of the operating vehicle.

13. The dispatching method according to claim 11, wherein:
  the unfilled vehicle is selected among the unfilled vehicles based on a number of occupants riding in the unfilled vehicles, and
  an unfilled vehicle with no occupant is selected over an unfilled vehicle with one or more occupants.

14. The dispatching method according to claim 11, further comprising:
  obtaining expected travel times of the unfilled vehicles to a location of the operating vehicle; and
  selecting the unfilled vehicle among the unfilled vehicles further based on the expected travel times.

* * * * *